M. W. KEITH.
SWINGING BRACKET.
APPLICATION FILED OCT. 6, 1913.
1,089,768.
Patented Mar. 10, 1914.
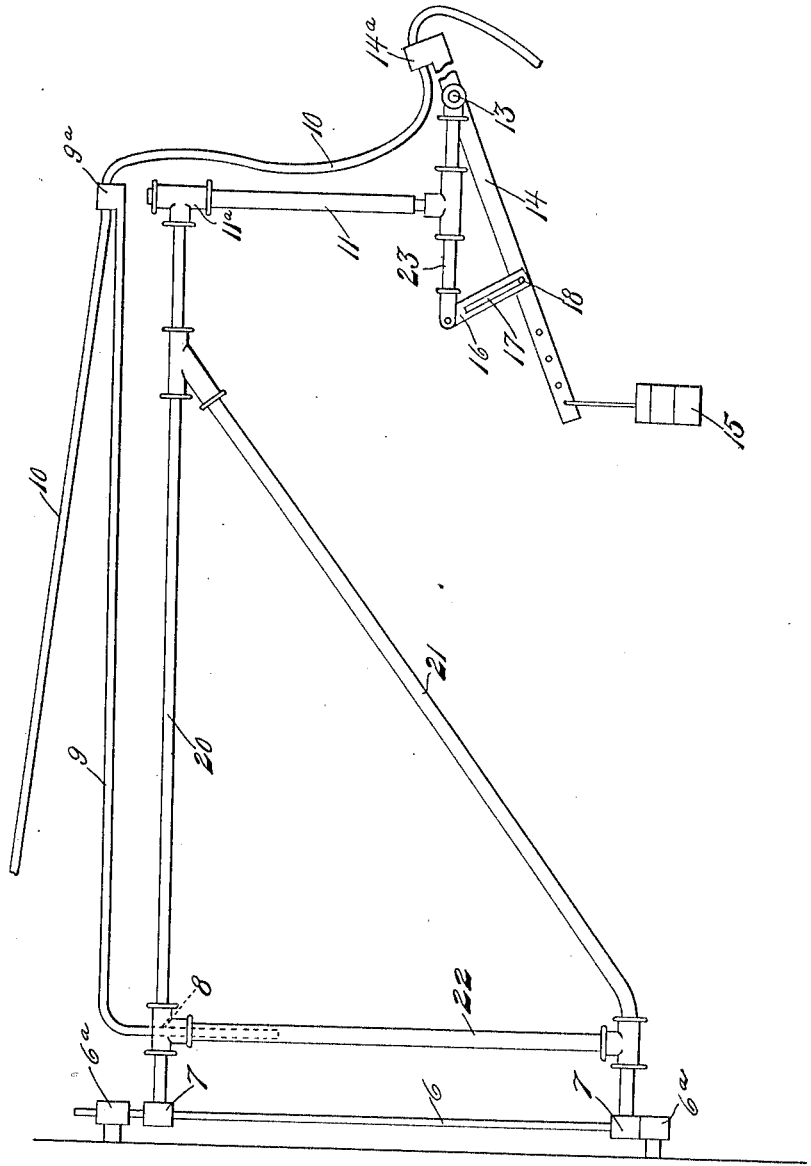
Witnesses
W. L. Richey
Anna Watters
Inventor
Marshall W. Keith
By John A. Bommhardt
Attorney

United States Patent Office.

MARSHALL W. KEITH, OF KENT, OHIO.

SWINGING BRACKET.

1,089,768.  Specification of Letters Patent.  Patented Mar. 10, 1914.

Application filed October 6, 1913. Serial No. 793,581.

*To all whom it may concern:*

Be it known that I, MARSHALL W. KEITH, citizen of the United States, residing at Kent, in the county of Portage and State of Ohio, have invented certain new and useful Improvements in Swinging Brackets, of which the following is a specification.

This invention relates to swinging brackets, and is particularly adapted and intended for use for supporting air hose, such as air hose employed in connection with pneumatic tools used for stone cutting, carving and the like, although it is capable of many other uses, such for example as supporting electric or gas conduits when used in connection with a tool such as a sad iron or the like. The bracket is capable of many analogous applications or uses.

The accompanying drawing is a side elevation of the bracket.

Referring specifically to the drawing, 6 indicates a rod held to a wall or other support by supporting devices 6$^a$. The upper bracket arm 20 has a collar 7 at one end which turns on the rod 6, and this arm is supported by a brace 21 at the inner end of which is another collar 7 which turns on the rod 6.

22 is an upright brace between the arms. The outer end of the arm 20 is provided with a depending part 11. These parts may be conveniently formed of tubes united by suitable couplings. At its lower end the tube 11 supports a cross bar or member 23 to one end of which is pivoted, at 13, a vertically swinging arm 14 which has at one end an adjustable counterweight 15. A link 16 is pivoted to the other end of the cross piece 23, and has a slot 17 in which a pin 18 works, said pin projecting from the bar 14. This allows a limited up and down swing of the bar 14. At its outer end the bar 14 has an eye 14$^a$ through which the hose or conduit 10 extends, and this hose or conduit also passes through an eye 9$^a$ at the outer end of a swinging arm 9 the inner end of which is bent down to fit into a socket at 8 extending into the upright piece 22, so that the arm 9 has a swinging movement independent of the main bracket, the hose or conduit being thus independently carried.

The supporting bracket thus constructed will carry a hose or conduit in various posi-tions suitable to permit manipulation of a tool or the like, such as a pneumatic tool. The construction permits vertical and horizontal swinging movement to accommodate the tool to the work. The pipe 11 may be turned in the coupling 11$^a$ at the end of the main arm 20, the hose supporting arm 9 being adapted to swing laterally to suit to various motions incident to the use of the tool. The work can thus remain in fixed position, and the tool moved around to get at all parts thereof, without buckling the hose or otherwise interfering with the power supply.

What I claim as new is:—

1. A bracket comprising a projecting arm, a vertically and horizontally swinging bar connected thereto, and provided with means to support a conduit or the like, and a supplemental horizontally swinging arm pivotally mounted on said arm and provided with means to support said conduit.

2. A bracket comprising a horizontally swinging arm, a cross piece connected thereto, a vertically swinging bar pivoted to said cross piece and provided at one end with means to engage a conduit or the like, and a stop connection between said bar and cross piece adapted to limit the swing of the former.

3. A bracket comprising a horizontally swinging member, a vertically swinging member pivoted thereto and provided with a device to engage a conduit or the like, and a supplemental horizontally swinging arm pivotally mounted on the first-mentioned member and provided with a device to engage said conduit.

4. A bracket comprising a horizontally swinging arm, a hanger depending from the outer end thereof, a cross piece at the lower end of said hanger, a vertically-swinging bar pivoted to one end of said bar and provided with a counterweight, and a flexible connection between the other end of said cross piece and the bar, and adapted to limit the swing of the latter.

In testimony whereof, I do affix my signature in presence of two witnesses.

MARSHALL W. KEITH.

Witnesses:
 JOHN A. BOMMHARDT,
 J. B. DAVIS.

Copies of this patent may be obtained for five cents each, by addressing the "Commissioner of Patents, Washington, D. C."